(12) United States Patent
Teppoeva et al.

(10) Patent No.: US 11,610,121 B2
(45) Date of Patent: Mar. 21, 2023

(54) IDENTIFYING PATTERNS IN EVENT LOGS TO PREDICT AND PREVENT CLOUD SERVICE OUTAGES

(71) Applicant: Microsoft Technology Licensing, LLC, Redmond, WA (US)

(72) Inventors: Tatiana Teppoeva, Redmond, WA (US); Vladimir Bakhmetyev, Sammamish, WA (US); Sailaja Malladi, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 338 days.

(21) Appl. No.: 16/891,899

(22) Filed: Jun. 3, 2020

(65) Prior Publication Data
US 2021/0383206 A1 Dec. 9, 2021

(51) Int. Cl.
*G06F 11/34* (2006.01)
*G06F 16/2458* (2019.01)
(Continued)

(52) U.S. Cl.
CPC ............ *G06N 3/08* (2013.01); *G06F 9/45558* (2013.01); *G06F 11/004* (2013.01);
(Continued)

(58) Field of Classification Search
CPC ........ G06N 3/08; G06N 3/063; G06N 3/0445; G06N 3/0454; G06N 3/02; G06N 3/088; G06F 16/2477; G06F 9/45558; G06F 11/004; G06F 11/008; G06F 11/3006; G06F 11/3447; G06F 11/3452; G06F 11/0766;
(Continued)

(56) References Cited

U.S. PATENT DOCUMENTS

| 8,826,277 B2* | 9/2014 | Chang ................. G06F 9/5072 718/1 |
| 2017/0116091 A1* | 4/2017 | Anderson ............. G06F 11/004 |

(Continued)

OTHER PUBLICATIONS

Loic Bontemps et al., Collective Anomaly Detection Based on Long Short-Term Memory Recurrent Neural Networks, 2016, [ Retrieved on Jun. 23, 2022]. Retrieved from the internet: <URL: https://link.springer.com/content/pdf/10.1007/978-3-319-48057-2.pdf> 12 Pages (141-152) (Year: 2016).*

(Continued)

*Primary Examiner* — Anibal Rivera

(57) ABSTRACT

In non-limiting examples of the present disclosure, systems, methods and devices for predicting hardware failure events are presented. A time series comprising event log data for a plurality of events and a plurality of event types that occurred on a server computing device may be received. The time series may be filtered for a subset of the plurality of event types. The filtered time series may be processed with a recurrent neural network that has been trained to predict hardware failure events from time series data comprising the subset of the plurality of event types. A prediction may be made that a hardware failure event will occur on the server computing device within a threshold duration of time. A prophylactic follow-up action corresponding to the predicted hardware failure event may be performed.

20 Claims, 9 Drawing Sheets

(51) Int. Cl.
*G06N 3/08* (2023.01)
*G06F 9/455* (2018.01)
*G06F 11/00* (2006.01)
*G06N 3/04* (2023.01)
*G06N 3/063* (2023.01)
*G06F 11/07* (2006.01)
*G06F 11/30* (2006.01)

(52) U.S. Cl.
CPC ....... *G06F 16/2477* (2019.01); *G06N 3/0445* (2013.01); *G06N 3/063* (2013.01); *G06F 11/008* (2013.01); *G06F 11/079* (2013.01); *G06F 11/0751* (2013.01); *G06F 11/0766* (2013.01); *G06F 11/0772* (2013.01); *G06F 11/0793* (2013.01); *G06F 11/3006* (2013.01); *G06F 11/3409* (2013.01); *G06F 11/3447* (2013.01); *G06F 11/3452* (2013.01); *G06F 2009/4557* (2013.01); *G06N 3/0454* (2013.01)

(58) Field of Classification Search
CPC ............... G06F 11/3409; G06F 11/079; G06F 11/0793; G06F 11/0751; G06F 11/0772; G06F 16/215; G06F 16/2474; G06F 16/285; G06F 9/542
See application file for complete search history.

(56) References Cited

U.S. PATENT DOCUMENTS

| | | |
|---|---|---|
| 2019/0228296 A1* | 7/2019 | Gefen ................... G06F 11/079 |
| 2020/0004616 A1 | 1/2020 | Natsumeda et al. |
| 2020/0004648 A1* | 1/2020 | Xu ......................... G06F 9/4856 |
| 2020/0050182 A1* | 2/2020 | Cheng .................. G06N 3/0454 |
| 2020/0065213 A1 | 2/2020 | Poghosyan et al. |
| 2021/0073190 A1* | 3/2021 | Bedadala ............ G06F 11/2056 |
| 2021/0344695 A1* | 11/2021 | Palani ...................... G06N 3/08 |

OTHER PUBLICATIONS

Yinglung Liang et al., Failure Prediction in IBM BlueGene/L Event Logs, 2007 IEEE, [Retrieved on Oct. 11, 2022]. Retrieved from the internet: <URL: https://ieeexplore.ieee.org/stamp/stamp.jsp?tp=&arnumber=4470294> 6 Pages (583-588) (Year: 2007).*
"International Search Report and Written Opinion Issued in PCT Application No. PCT/US21/025693", dated Jul. 26, 2021, 12 Pages.

* cited by examiner

IDENTIFYING PATTERNS IN EVENT LOGS TO PREDICT AND PREVENT CLOUD SERVICE OUTAGES

BACKGROUND

The amount of data that is stored and accessed in the cloud has expanded exponentially in recent years. Hardware failures in servers that makeup the infrastructure of the cloud are difficult to predict and often lead to interruptions in service for virtual machines that are hosted by those servers. Additionally, hardware failures in servers are often preceded with little if any warning, leading to widespread service interruptions for affected devices.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for predicting hardware failure events. A recurrent neural network may be trained to predict server hardware failure events that are going to occur in the near future. The recurrent neural network may be trained to process time series data comprising event log data for a plurality of events and a plurality of event types to predict the hardware failure events. The time series data may be preprocessed prior to training the recurrent neural network with it. The preprocessing may comprise removing events of certain event types from a time series, segmenting a time series to include a specific number of events, de-duplicating events, and transforming time series data.

Once trained, the recurrent neural network may receive new time series data from server computing devices. The new time series data may be received in real or almost real time. The new time series data may also be preprocessed prior to it being fed to the recurrent neural network. The preprocessing may comprise removing events of certain event types from a time series, segmenting a time series to include a specific number of events, de-duplicating events, and transforming time series data. The recurrent neural network may then process the time series, which includes specific event types that the neural network has been trained to process, as well as time stamps associated with those events. The recurrent neural network may predict whether a server computing device is likely to have a hardware failure event based on the order and/or temporal spacing of the events in the time series.

Upon determining that a server computing device is going to experience a hardware failure event, one or more prophylactic mitigation actions may be taken. Those prophylactic mitigation actions may include migrating existing workloads to different server computing devices, freezing onboarding of new workloads to the server computing device that is predicted to experience a hardware failure event, and/or flagging the server computing device that is predicted to experience a hardware failure event.

BRIEF DESCRIPTION OF THE DRAWINGS

Non-limiting and non-exhaustive examples are described with reference to the following figures.

DETAILED DESCRIPTION

Figure 1:
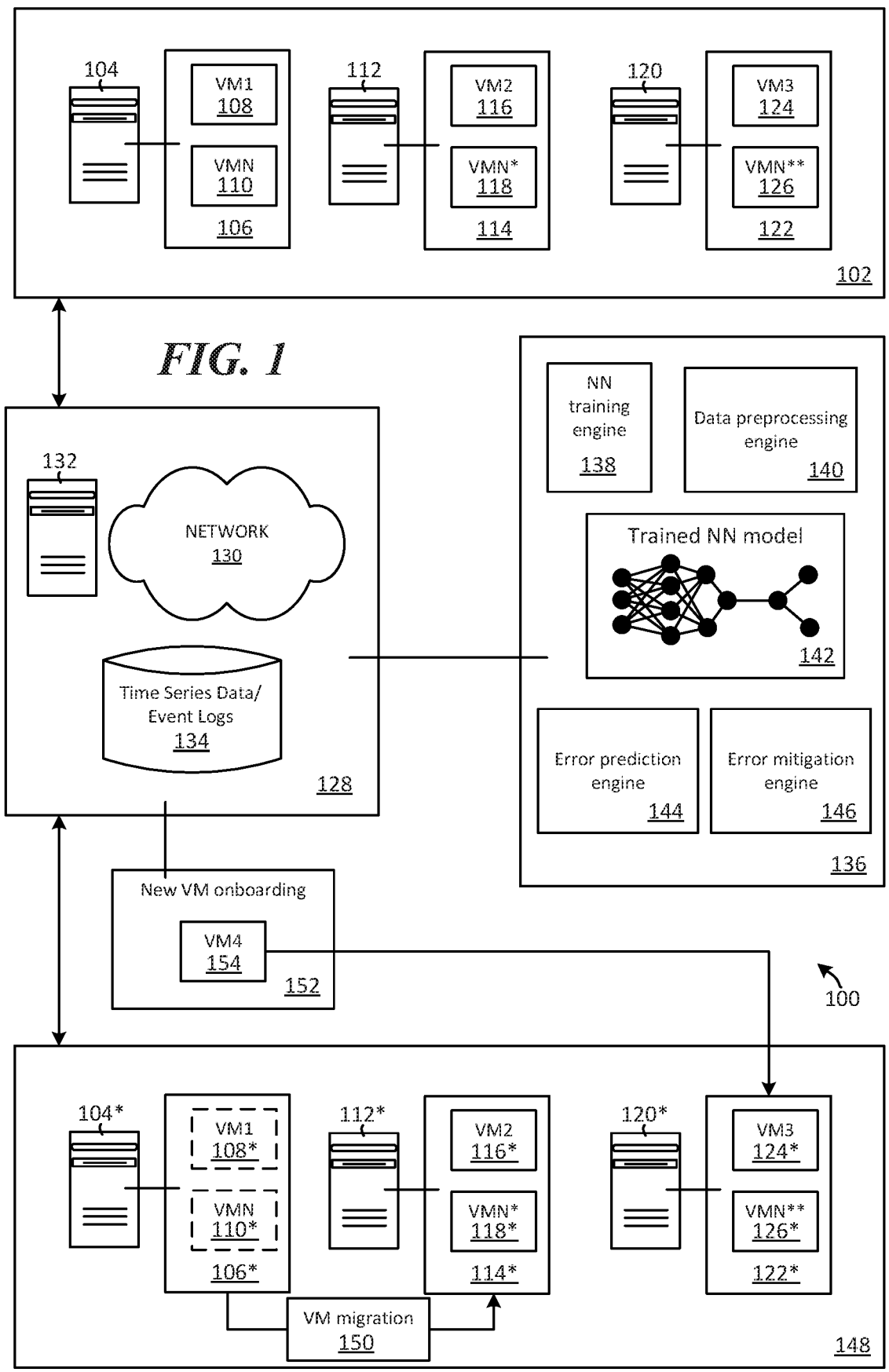
FIG. 1 is a schematic diagram illustrating an example distributed computing environment for predicting hardware failure events.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for predicting hardware failure events. A hardware failure prediction service may receive time series data from server computing devices that the hardware failure prediction service is monitoring. The time series data may include event log data (e.g., system event log data, storage drive event log data) for a plurality of events and a plurality of event types. The time series data may be provided to a data store where the hardware failure prediction service may utilize it for training a machine learning model for predicting hardware failure events. In some examples, time series data may be provided to the hardware failure prediction service in real or near real time for processing by a machine learning model to predict whether a server computing device that generated the time series data will experience a hardware failure event. In additional examples, the time series data may be provided to the hardware failure prediction service in real or near real time for processing by a machine learning model to predict whether a server computing device that generated the time series will experience a hardware failure event within a threshold duration of time. The machine learning model that is utilized to predict whether a hardware failure event will occur may comprise a model that processes sequential data. In some examples, the machine learning model may comprise a recurrent neural network. The recurrent neural network may comprise a long short-term memory (LSTM) neural network or a gated recurrent unit (GRU) neural network.

The hardware failure prediction service may train a machine learning model with time series data from a plurality of server computing devices. The hardware failure prediction service may preprocess that data prior to training the machine learning model. The hardware failure prediction service may identify time series for training the machine learning model that have resulted in one or more types of hardware failure events (e.g., CPU internal error (IERR), uncorrectable memory error). The hardware failure prediction service may filter out event types from time series data that do not correspond to event types that the machine learning model will process to predict whether a hardware failure event will occur. The hardware failure prediction service may segment time series data to include a specific number of events of one or more non-filtered types that precede a hardware failure event that occurred on a server computing device. The hardware failure prediction service may additionally perform transformation operations and/or de-duplication operations on time series data prior to training the machine learning model. The de-duplication operations may include collapsing a plurality of events of a same type into a single event. The transformation operations may comprise identifying timestamps from one or more events in a time series that are inaccurate and transforming them to a time between a previous event timestamp in the time series and a following event timestamp in the time series. In additional examples, the transformation operations may comprise generating a vector for each event in a time series. A generated vector may comprise a time dimension corresponding to a time stamp for an event and an event type dimension corresponding to an event type of an event. In some examples, a generated vector may comprise a sensor type dimension corresponding to a type of a sensor that generated an event. In addition to training the machine learning model with time series data from servers that experienced a hardware failure event, the machine learning model may be trained with time series data from servers that did not experience a hardware failure event.

Upon determining that the machine learning model has been trained to within a threshold degree of accuracy for predicting that a hardware failure event is going to occur, or occur within a threshold duration of time, the hardware failure prediction service may start feeding live (or near real time) time series data into the trained model for processing. Like the training data, the live data may be preprocessed to only include the event types that the machine learning model has been trained to process. Further, the live data may be segmented prior to processing by the machine learning model to include only a specific number of events of the event types that the machine learning model has been trained to process. The hardware failure prediction service may also preprocess the live data to remove duplicative events and transform the time series data as discussed above in relation to the training preprocessing.

In some examples, time series data may be provided directly to an untrained machine learning model (e.g., recurrent neural network) rather than pretraining the machine learning model prior to providing it with the data. For example, if the time series data is relatively small (e.g., two event types and five minutes of data vs. three event types and five days of data), pretraining the model may not be necessary to obtain a threshold degree of accuracy for predicting hardware failure events. Additionally, if patterns in time series data change frequently, pretraining the machine learning model may not be as beneficial as it would be for time series data that includes patterns that do not change as frequently.

A scoring engine may apply one or more functions (e.g., softmax, sigmoid) to one or more output values from the machine learning model. One or more scores may thus be calculated, and each score may correspond to a likelihood that a server computing device that generated the time series will experience a hardware failure event of a specific type and/or of a specific type within a threshold duration of time. If a determination is made based on one or more of those scores that a hardware failure event is going to occur and/or occur within a threshold duration of time, the hardware failure prediction service may perform one or more operations to mitigate the effects of the predicted failure. In some examples, one or more virtual machines and/or workloads executed by the server computing device may be migrated to one or more different server computing devices. In additional examples, a freeze on onboarding new virtual machines and/or workloads may be placed on the server computing device that is predicted to have a hardware failure event. In additional examples, the hardware failure event may be flagged and/or otherwise reported to an administrator and/or quality of service user account.

The systems, methods, and devices described herein provide technical advantages for predicting hardware failure events that impact functionality in cloud-based services. Processing costs (e.g., CPU cycles) and memory costs associated with onboarding new workloads on server computing devices that are going to fail in the short-term, and subsequently having to move those workloads to different server computing devices are significantly reduced. The mechanisms described herein provide the ability to predict hardware failure events, thereby allowing for the pre-emptive freezing of onboarding of new virtual machines and workloads to server computing devices that are close to failing. Hardware related service interruptions of cloud-based services are also reduced via implementation of the systems, methods and devices described herein. The mechanisms described herein provide for the migration of virtual machines and workloads from server computing devices that are predicted to fail in the short term to healthy server computing devices.

FIG. 1 is a schematic diagram illustrating an example distributed computing environment 100 for predicting hardware failure events. Computing environment 100 includes first cloud computing sub-environment 102, network and processing sub-environment 128, machine learning sub-environment 136, new virtual machine onboarding sub-environment 152, and second cloud computing sub-environment 148. First cloud computing sub-environment 102 and second cloud computing sub-environment 148 include the same server computing devices. However, virtual machines have been re-allocated and onboarded in second cloud computing sub-environment 148 based on a determination that there will be a hardware failure event on one of the server computing devices that occurs within a threshold duration of time.

First cloud computing sub-environment 102 includes server computing device 104, server computing device 112, and server computing device 120. First server computing device 104 hosts virtual machine one 108 and virtual machine N 110, as illustrated by virtual machines 106. Second server computing device 112 hosts virtual machine two 116 and virtual machine N*, as illustrated by virtual machines 114. Server computing device 120 hosts virtual machine three 124 and virtual machine N** 126, as illustrated by virtual machines 122. Server computing devices 104, 112 and/or 120 may comprise the same or different platforms. That is, server computing devices 104, 112 and/or 120 may comprise same or different hardware, same or different firmware, and/or same or different software. The virtual machines illustrated in first cloud computing sub-environment may comprise same or different computing workloads from same or different entities.

Network and processing sub-environment 128 includes server computing device 132, network 130, and time series data/event logs data store 134. Any and all of the computing devices described herein may communicate via a network, such as network 130. Server computing device 132 is illustrative of one or more server computing devices that may host a hardware failure prediction service. In some examples, the hardware failure prediction service may reside on the computing devices on which failures are being predicted for (e.g., server computing device 104, server computing device 112, server computing device 120). In other examples, the hardware failure prediction service may be hosted on one or more server computing devices that are separate from computing devices on which failures are being predicted for. Time series data/event logs data store 134 includes time series data from one or more server computing devices for which telemetry data is being monitored. The time series data may comprise system event log data as described below.

The hardware failure prediction service may monitor operations that are executed by one or more server computing devices and/or system data for one or more server computing devices. The hardware failure prediction service receives telemetry data from server computing devices that are executing virtual machines, such as server computing device 104, server computing device 112, and server computing device 120. The telemetry data may comprise system event log data for each server computing device. The system event log data for each server computing device may be received as a time series (e.g., with timestamp information relating to times that events occurred, times that events were recorded, and/or times that event records were received). The system event log data may include system event types that are recorded by server computing devices, timestamps for when system events occurred, timestamps for when system events were recorded and/or reported, identities of sensors where system events occurred or that recorded system events, and/or system event details. Examples of system event types that may be included in the system event log data include: voltage exceeding a threshold value, temperature exceeding a threshold value, operating system reboot, internal component failure events, power supply being inserted, and/or power supply being removed.

The hardware failure prediction service may host and/or execute one or more engines, models, and/or operations associated with machine learning sub-environment 136.

Machine learning sub-environment 136 includes neural network training engine 138, data preprocessing engine 140, trained neural network model 142, error prediction engine 144, and error mitigation engine 146. Neural network training engine 138 may perform one or more operations associated with processing time series system event log data for a plurality of specific event types with a recurrent neural network model and training the model to predict hardware failure events. In some examples, the recurrent neural network may be an LSTM neural network. In other examples, the recurrent neural network may be a GRU neural network. In some examples, neural network training engine 138 may train the recurrent neural network to predict hardware failure events that will occur within a threshold duration of time. In additional examples, neural network training engine 138 may train the recurrent neural network to predict likelihoods that hardware failure events will occur within different threshold durations of time. The recurrent neural network may be trained by neural network training engine 138 to predict catastrophic hardware failure events. In some examples, the catastrophic hardware failure events may comprise CPU IERR (internal error) events and/or uncorrectable memory errors. In other examples, the recurrent neural network may be trained by neural network training engine 138 to predict hardware failure events for storage drives (e.g., solid state drives, hard disk drives, hybrid drives, etc.).

Data preprocessing engine 140 may perform one or more operations associated with preprocessing time series data from one or more server computing devices for further processing by a recurrent neural network. In some examples, the time series data from the one or more server computing devices may be sent from those server computing devices to a data store, such as time series data/event logs data store 134. Data preprocessing engine 140 may perform one or more operations associated with preprocessing training data for training a recurrent neural network for predicting hardware failure events, as well as preprocessing data for a fully trained recurrent neural network that has been trained to predict hardware failure events. The preprocessing operations may comprise one or more of: segmenting time series data into lengths of a specific duration of time or a specific number of events, filtering time series data for specific event types, transforming time series data, and/or de-duplicating events in time series data. In training examples, the preprocessing operations may additionally or alternatively include filtering time series that result in specific result types (e.g., only providing time series that resulted in catastrophic failures of one or more specific types to the training model). Additional details related to data preprocessing engine 140 and its corresponding operations are provided below in relation to FIG. 2.

Error prediction engine 144 may perform one or more operations associated with applying a function to one or more values identified in an output layer of trained neural network model 142 from processing of system event log data from a server computing device and predicting a likelihood that a catastrophic hardware failure event will occur on the server computing device within a threshold duration of time.

Error mitigation engine 146 may perform one or more operations to mitigate issues associated with predicted hardware failure events. Error mitigation engine 146 may flag and/or report predicted hardware failure events for manual intervention. Error mitigation engine 146 may automatically migrate virtual machines and/or workloads from a server computing device on which a hardware failure event is predicted to occur to one or more healthy server computing devices. Error mitigation engine 146 may stop the onboarding of new virtual machines and/or workloads to a server computing device on which a hardware failure event is predicted to occur.

In this example, time series data from server computing device 104 is received by the hardware failure prediction service. The hardware failure prediction service may have trained a recurrent neural network, such as trained neural network model 142, to predict that hardware failure events will occur within a threshold duration of time based on processing of time series data comprising system event log data for a plurality of events and a plurality of event types. For example, trained neural network model 142 may have been trained to predict whether a hardware failure event is going to occur within the next week or the next day based on processing a time series of system event log data that comprises a specific number of events (e.g., twenty events, fifteen events, ten events) in the time series. In some examples, the specific number of events may be comprised of only the plurality of event types. For example, the hardware failure prediction service may receive a time series that includes event data for fifteen event types but filter the time series for only the plurality of event types that trained neural network model 142 has been trained to predict hardware failure events from. The hardware failure predictions service may then "cut" that time series that includes only the remaining event types at a location corresponding to the specific number of events in the time series of the remaining event types. In some examples, the time series may be sent from server computing device 104 to time series data/event logs data store 134, where the hardware failure prediction service processes it. In other examples, the time series may be sent from server computing device 104 directly to the hardware failure prediction service. Thus, in some examples, the hardware failure prediction service may process (and preprocess) time series data in real or near real time as the event data is generated.

In this example, a determination is made, based on processing the filtered time series from server computing device 104 with trained neural network model 142, that a hardware failure event will occur on server computing device 104 within a threshold duration of time. As such, the hardware failure prediction service performs prophylactic follow-up actions corresponding to the predicted hardware failure event. The hardware failure prediction service may perform actions to prevent an interruption of service with regard to virtual machines and/or computing workloads it is handling. The hardware failure prediction service may additionally or alternatively perform actions to prevent an interruption of service with regard to virtual machines and/or computing workloads that may have otherwise been assigned to server computing device 104.

Second cloud computing sub-environment 148 includes server computing device 104*, which is the same computing device as server computing device 104; server computing device 112*, which is the same computing device as server computing device 112; and server computing device 120*, which is the same computing device as server computing device 120. In this example, to mitigate the predicted hardware failure of server computing device 104*, the hardware failure prediction service automatically migrates virtual machine one 108* and virtual machine N 110* in virtual machines 106 to server computing device 112*. Thus, virtual machines 114* now includes virtual machine 116*, virtual machine N* 118, virtual machine one 108* and virtual machine 110*. Additionally, a new virtual machine, such as virtual machine four 154 in new virtual machine onboarding sub-environment 152, may be in a queue to be onboarded to a cloud service hosted by server computing devices 104*, 112* and 120*. However, although virtual machine four 154 may have previously been queued up to be allocated to server computing device 104* for execution, virtual machine four 154 is now sent to server computing device 120* because of the predicted hardware failure event on server computing device 104*. Thus, the hardware failure prediction service mitigates against service interruptions and/or quality of service issues with virtual machines that were already executed by a server computing device that is predicted to have a hardware failure event, as well as virtual machines that would have been onboarded to a server computing device that is predicted to have a hardware failure event.

Figure 2:
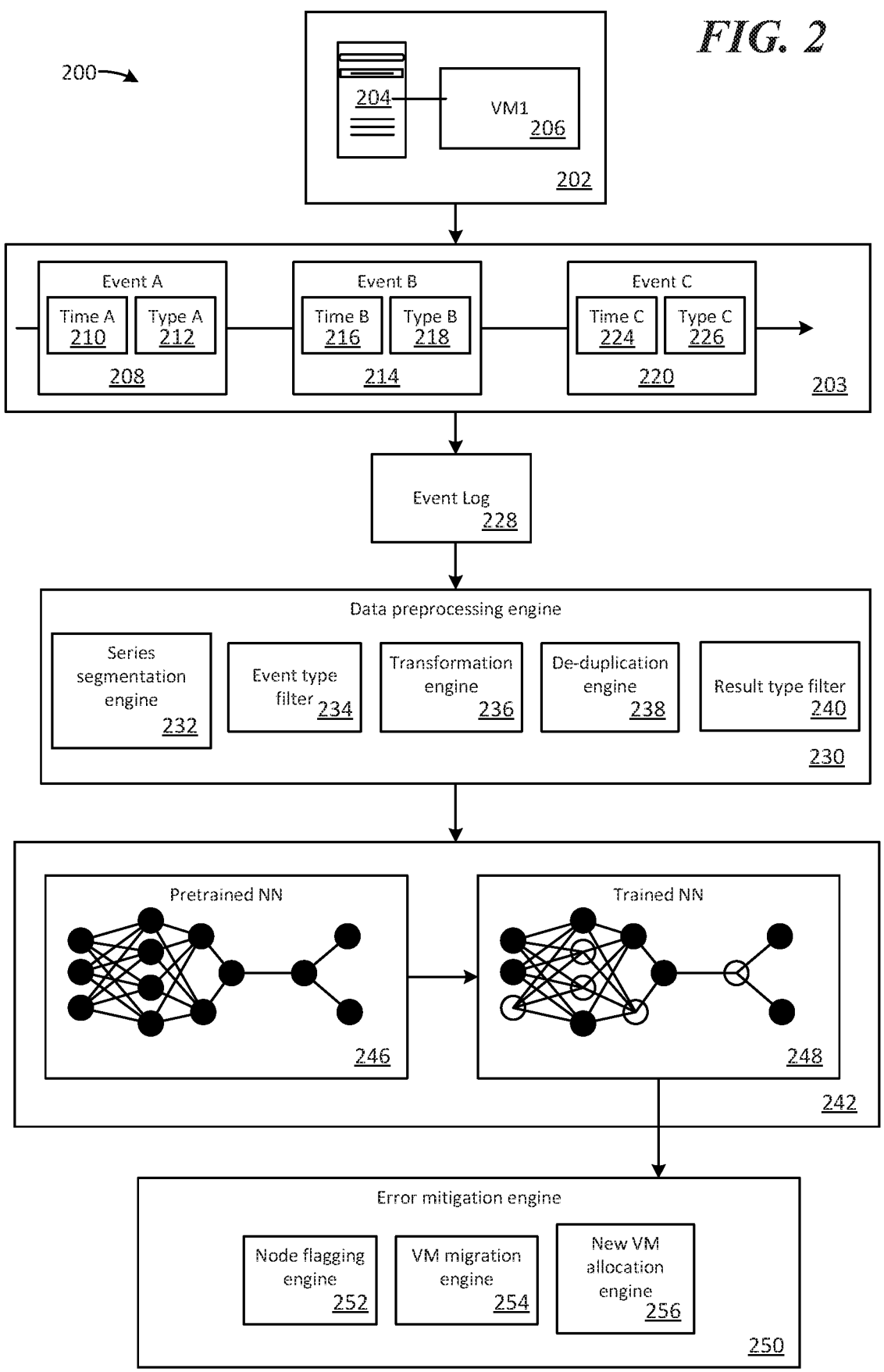
FIG. 2 illustrates a basic flow diagram, including data preprocessing engines, for training a neural network and applying that trained neural network for predicting hardware failure events.

FIG. 2 illustrates a basic flow diagram 200, including data preprocessing engines, for training a neural network and applying that trained neural network for predicting hardware failure events. Diagram 200 includes event generation sub-environment 202, time series 203, event log 228, data preprocessing engine 230, machine learning sub-environment 242, and error mitigation engine 250.

Event generation sub-environment 202 includes server computing device 204, which hosts virtual machine one 206. A plurality of sensors in server computing device 204 may generate event data related to events that occur on server computing device 204. Examples of events for which event data may be generated include voltage exceeding a threshold value, temperature exceeding a threshold value, operating system reboot, internal component failure events, power supply being inserted, and/or power supply being removed. The event data may be tagged with one or more timestamps corresponding to a time that each event occurred, a time that each event was detected, and/or a time that the event data for an event was generated.

The event data generated by server computing device 204 may be comprised in a time series, such as time series 203. Time series 203 includes event A 208, event B 214, and event C 220. Event A 208 includes time A data 210, which may correspond to a time that event A 208 occurred. Event A 208 also includes type A data 212, which indicates the event type of event A 208. Event B 214 includes time B data 216, which may correspond to a time that event B 214 occurred. Event B 214 also includes type B data 218, which indicates the event type of event B 214. Event C 220 includes time data C 224, which may correspond to a time that event C 220 occurred. Event C 220 also includes type C data 226, which indicates the event type of event C 220. Although there are only three events shown in time series 203, it should be understood that a time series may include additional events (e.g., twenty events, fifty events, one hundred events, one thousand events). Similarly, although there are only three event types shown in time series 203, it should be understood that a time series may include additional event types (e.g., five event types, ten event types, twenty event types).

Time series 203 may be saved to event log 228. Event log 228 may be incorporated in the hardware failure prediction service. For example, event log 228 may be comprised in a data store, such as time series data/event logs data store 134 in FIG. 1, which may be incorporated in the hardware failure prediction service. The size of each time series that is saved to event log 228 may be based on a number of events in a time series and/or based on a duration of time from a first event to a last event. For example, each block of X number of events may be saved as a separate time series to event log 228. Alternatively, each block of Y minutes/hours/days may be saved as a separate time series to event log 228.

Each time series may be provided to data preprocessing engine 230, which may be incorporated in the hardware failure prediction service. Data preprocessing engine 230 includes series segmentation engine 232, event type filter 234, transformation engine 236, de-duplication engine 238, and result type filter 240.

Series segmentation engine 232 may further reduce the size of a time series from event log 228 based on a number of events and/or a duration of time.

Event type filter 234 may filter out events from a time series based on event type. For example, if a neural network has only been trained to predict hardware failure events based on event type A data 212 and event type C data 226, event type filter 234 may remove event B 214 from time series 203 because event B 214 includes event type B data 218, which the neural network has not been trained to identify hardware failure events from.

Transformation engine 236 may identify timestamps for one or more events in a time series that are inaccurate and transform them to a time between a previous event timestamp in the time series and a following event timestamp in the time series. In additional examples transformation engine 236 may generate a vector for each event in a time series. A generated vector may comprise a time dimensions corresponding to a time stamp for an event and an event type dimension corresponding to an event type of an event. In some examples, a generated vector may additionally or alternatively comprise a sensor type dimension corresponding to a type of sensor that generated an event. The vectors for a time series may be provided to a neural network, such as pretrained neural network 246 and trained neural network 248, for processing.

De-duplication engine 238 may identify duplicate events in a time series and condense them into a single event.

Result type filter 240 is only applied for the training phase of the process and is not applied during run-time to predict hardware failure events on a fully trained neural network. Result type filter 240 may identify time series in event log 228 that resulted in the types of hardware failure events (e.g., IERR, uncorrectable memory error) that the neural network that is being trained is going to predict. Thus, the neural network may be trained to predict the correct hardware failure events by being fed the time series identified by result type filter 240. In training the neural network to predict hardware failure events, it may also be fed time series that did not result in the types of hardware failure events that the neural network is being trained to predict. The neural network may be trained using manual or automated feedback loops based on the types of results that are expected and the known result of the time series.

Machine learning sub-environment 242 includes pretrained neural network 246 and trained neural network 248. Pretrained neural network 246 and trained neural network 248 may comprise recurrent neural networks (e.g., an LSTM neural network, a GRU neural network). The result of training pretrained neural network 246 is reflected by the non-filled neurons in the first, second, third, and fifth layers of trained neural network 248. Those neurons may have been modified based on feedback loops as described above. In examples where trained neural network 248 is a GRU neural network, the modification to a neuron during training may comprise a modification to a value of a reset gate function and/or a modification to a value of an update gate function. In examples where trained neural network 248 is an LSTM neural network, the modification to a neuron during training may comprise a modification to a value of an input gate function, a modification to a value of a forget gate function, and/or a modification of a value of an output gate function. In additional examples, the modification to a trained neural network, such as pretrained neural network 246 may comprise adjusting weights and/or connections between neurons.

Upon predicting that a hardware failure event of a specific type is going to occur within a threshold duration of time, the hardware failure prediction service may execute operations associated with error mitigation engine 250. Error mitigation engine 250 includes node flagging engine 252, virtual machine migration engine 254, and new virtual machine allocation engine 256.

Node flagging engine 252 may tag a node (e.g., a server) that is predicted to have a hardware failure event within a threshold duration of time. In some examples, node flagging engine 252 may send an electronic message to a user account associated with an administrator and/or quality of service professional that is associated with the node that is being flagged. In additional examples, node flagging engine 252 may mark a node as being predicted to have a hardware failure event within a threshold duration of time in a device monitoring application. The marking of the node in the application may include an indication of the type of hardware failure event that is predicted to occur and/or an estimated time that the hardware failure event is going to occur.

Virtual machine migration engine 254 may migrate one or more virtual machines and/or workloads that are being executed by a node (e.g., a server) that is predicted to have a hardware failure event within a threshold duration of time to one or more healthy servers.

New virtual machine allocation engine 256 may block new virtual machines and/or workloads from onboarding to a node (e.g., a server) that is predicted to have a hardware failure event within a threshold duration of time. As such, new virtual machines and/or workloads may be allocated to healthy servers that will not fail in the near future, thereby providing uninterrupted service for those virtual machines and/or workloads.

Figure 3:
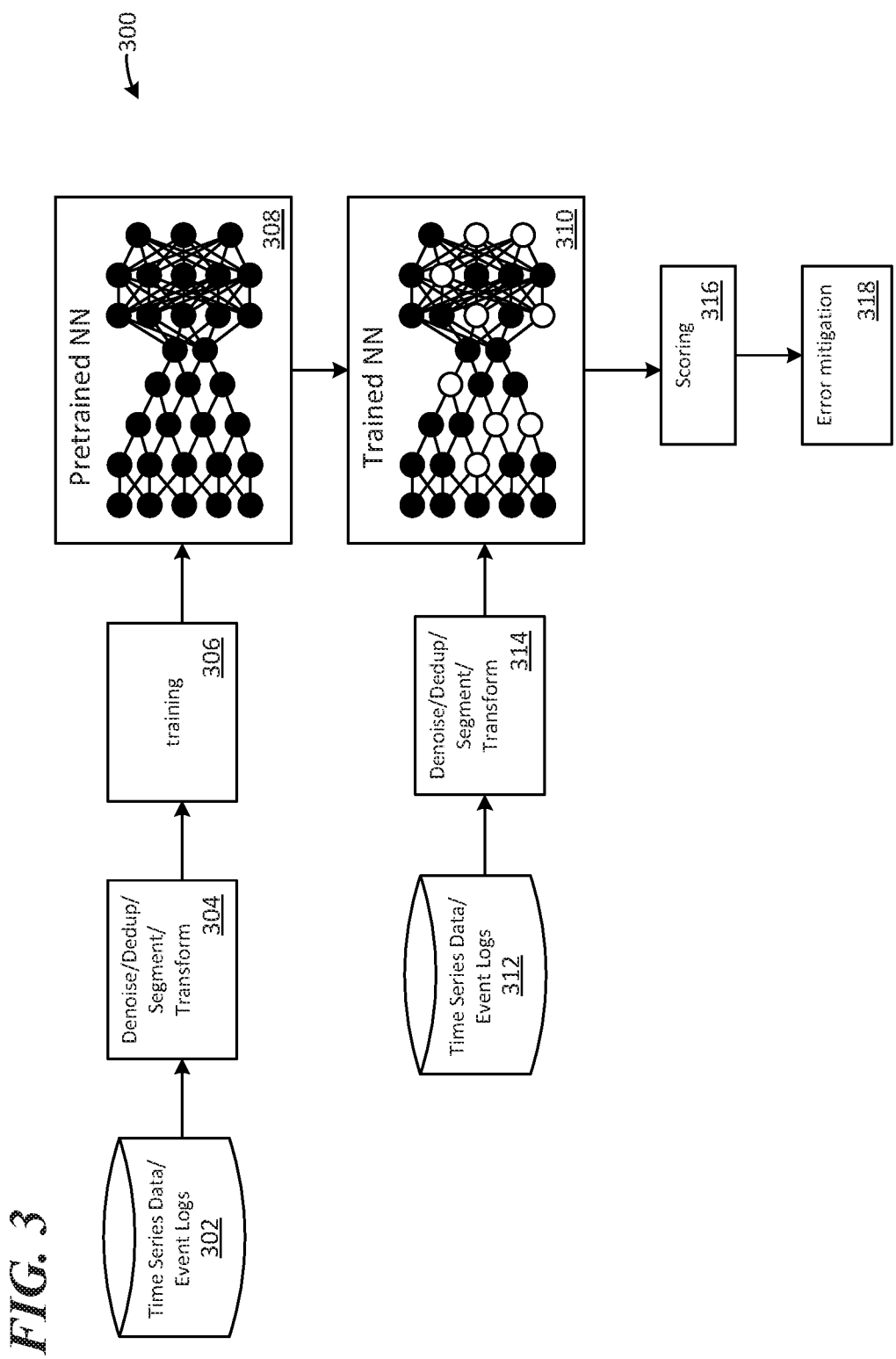
FIG. 3 illustrates a simplified distributed computing environment and block diagram for predicting hardware failure events with a neural network.

FIG. 3 illustrates a simplified distributed computing environment and block diagram 300 for predicting hardware failure events with a neural network. Distributed computing environment and block diagram 300 include training time series data/event logs data store 302, first preprocessing block 304, training block 306, pretrained neural network 308, run-time time series data/event logs data store 312, second preprocessing block 314, trained neural network 310, scoring block 316, and error mitigation block 318.

Training time series data/event logs 302 comprises time series data (e.g., event log data) from one or more server computing devices. First preprocessing block 304 represents a plurality of engines for preprocessing time series data that will be used for training pretrained neural network 308. First preprocessing block 304 may represent a denoising engine, a deduplication engine, a segmentation engine, and/or a transformation engine. In some examples, first preprocessing block 304 may additionally or alternatively represent an event type filter and/or a result type filter.

A plurality of time series that have been preprocessed via the engines represented by first preprocessing block 304 may be fed and processed by pretrained neural network 308, which represents an untrained recurrent neural network (e.g., LSTM, GRU) prior to being modified via processing of training data. This training is represented by training block 306. Pretrained neural network 308 may process time series data comprising a plurality of specific event types (e.g., voltage over a threshold value recorded by a sensor, temperature over a threshold value recorded by a sensor), where the time series resulted in one or more specific hardware failure events (e.g., IERR, uncorrectable memory error). Pretrained neural network 308 may be modified depending on whether it correctly predicted that a hardware failure event occurred within a threshold duration of time for those time series. Similarly, pretrained neural network 308 may process time series data comprising a plurality of specific event types that did not result in one or more specific hardware failure events. Pretrained neural network 308 may be modified depending on whether it correctly predicted that a hardware failure event would not occur within threshold duration of time for those time series.

Run-time time series data/event logs data store 312 comprises time series data (e.g., event log data) from one or more server computing devices. In some examples, time series data may not be stored prior to being provided to preprocessing engines and a neural network during run-time. Second preprocessing block 314 represents a plurality of engines for preprocessing time series data during run-time prior to feeding that data to trained neural network 310. The preprocessed data from those engines is fed and processed by trained neural network 310 to determine whether a hardware failure event (e.g., IERR, uncorrectable memory error) will occur on the server within a threshold duration of time. Second preprocessing block 314 may represent a denoising engine, a de-duplication engine, a segmentation engine, and/or a transformation engine.

Scoring block 316 represents a scoring engine which may apply one or more functions to values of an output layer of trained neural network 310 to generate a score corresponding to a likelihood that a hardware failure event that trained neural network 310 has been trained to predict will occur within a threshold duration. In some examples, the function that is applied may be a sigmoid classifier function. In other examples, the function that is applied may be a softmax classifier function.

Error mitigation block 318 represents one or more error mitigation engines that may be implemented by the hardware failure prediction service to prevent interruptions or other problems associated with server hardware failures. For example, error mitigation block 318 may represent a node flagging engine, a virtual machine migration engine, and/or a new virtual machine allocation engine.

Figure 4:
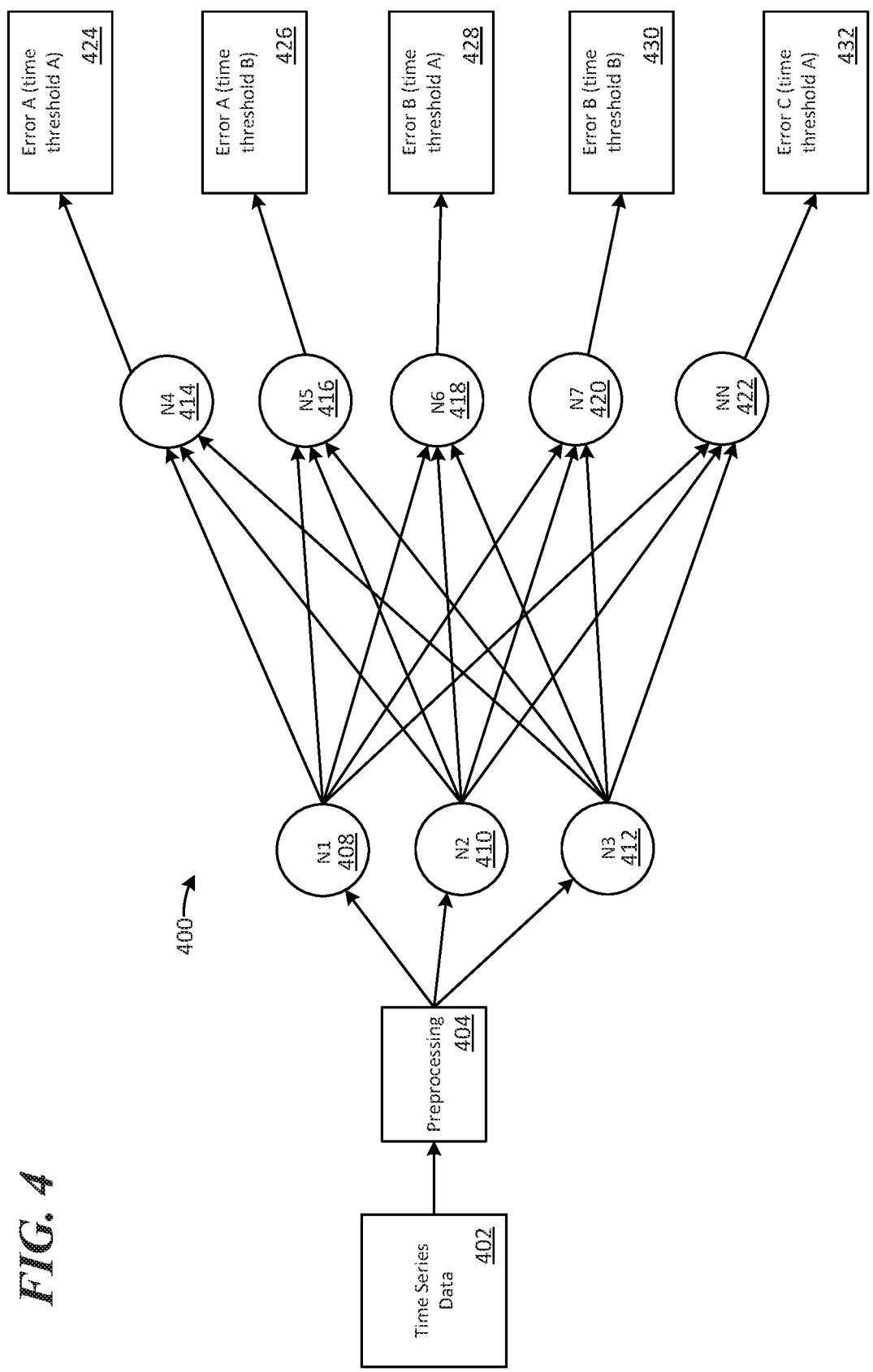
FIG. 4 illustrates the processing of time series data by a neural network that has been trained to predict hardware failure events from time series data including data for a plurality of event types.

FIG. 4 illustrates the processing of time series data by a neural network 400 that has been trained to predict hardware failure events from time series data including data for a plurality of event types. Neural network 400 may comprise a recurrent neural network. The recurrent neural network may comprise an LSTM neural network or a GRU neural network.

Neural network 400 is fed time series data 402 that has been preprocessed by a plurality of preprocessing engines represented by preprocessing block 404. The preprocessing may comprise removing/filtering out event types that neural network 400 has not been trained to process to predict hardware failure events. The preprocessing may further comprise segmenting a time series to a specific number of events of a plurality of event types that neural network 400 has been trained to process to predict hardware failure events. In some examples, the preprocessing may include transforming time series data 402, de-noising time series data 402, and/or de-duplicating time series data 402.

Neural network 400 includes a first layer that comprises neuron one 408, neuron two 410 and neuron three 412.

Neural network 400 also includes a second layer that comprises neuron four 414, neuron five 416, neuron six 418, neuron seven 420, and neuron N 422. According to some examples, when neural network 400 processes a time series comprised of system event log data for a plurality of events and a plurality of event types that occurred on a server, each of the neurons in the second layer (the output layer) may produce a value to which a function is applied to determine whether a hardware failure event will occur within a threshold duration of time.

Neuron four 414 may produce a value based on processing of a time series, a function (e.g., sigmoid, softmax) may be applied to the value, and a score may be calculated based on application of that function to the value. In examples where the score is above a threshold value a determination may be made that a hardware failure event of a first type (e.g., error A) will occur within a first threshold duration of time (threshold A). This is illustrated by first prediction block 424.

Neuron five 416 may produce a value based on processing of a time series, a function (e.g., sigmoid, softmax) may be applied to the value, and a score may be calculated based on application of that function to the value. In examples where the score is above a threshold value a determination may be made that a hardware failure event of a first type (e.g., error A) will occur within a second threshold duration of time (threshold B). This is illustrated by second prediction block 426.

Neuron six 418 may produce a value based on processing of a time series, a function (e.g., sigmoid, softmax) may be applied to the value, and a score may be calculated based on application of that function to the value. In examples where the score is above a threshold value a determination may be made that a hardware failure event of a second type (e.g., error B) will occur within a first threshold duration of time (threshold A). This is illustrated by third prediction block 428.

Neuron seven 420 may produce a value based on processing of a time series, a function (e.g., sigmoid, softmax) may be applied to the value, and a score may be calculated based on application of that function to the value. In examples where the score is above a threshold value a determination may be made that a hardware failure event of a second type (e.g., error B) will occur within a second threshold duration of time (threshold B). This is illustrated by fourth prediction block 430.

Neuron N 422 may produce a value based on processing of a time series, a function (e.g., sigmoid, softmax) may be applied to the value, and a score may be calculated based on application of that function to the value. In examples where the score is above a threshold value a determination may be made that a hardware failure event of a third type (e.g., error C) will occur within a first threshold duration of time (threshold A). This is illustrated by fifth prediction block 432.

Figure 5:
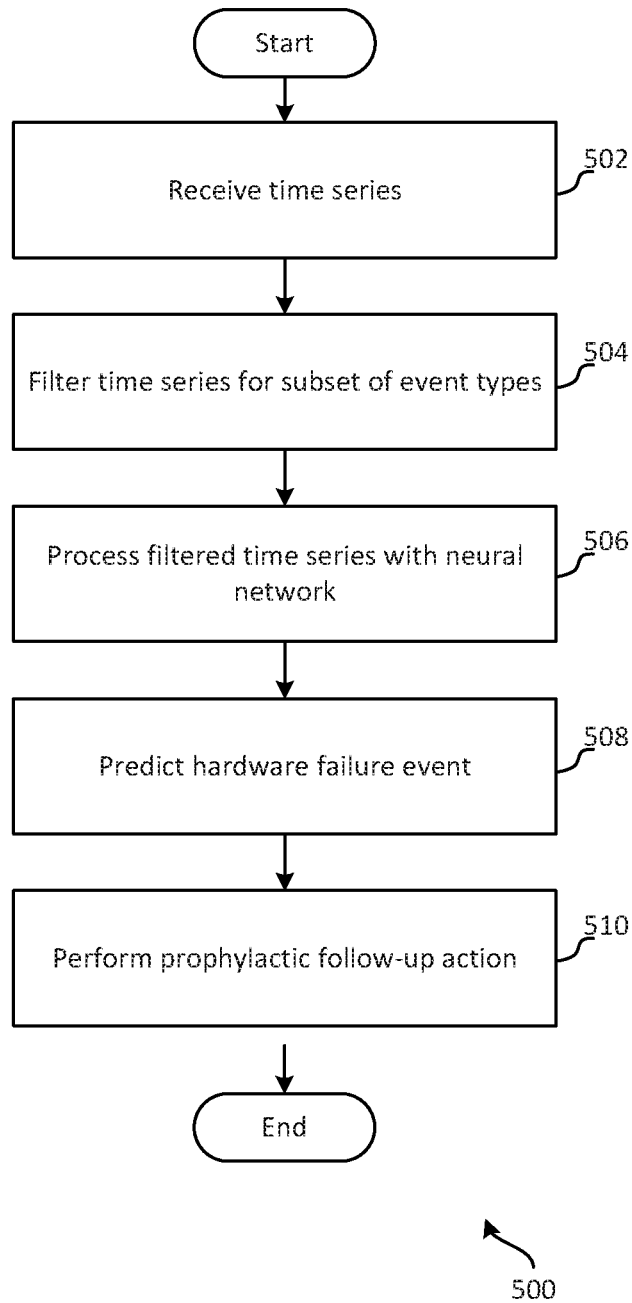
FIG. 5 is an exemplary method for predicting hardware failure events.

FIG. 5 is an exemplary method 500 for predicting hardware failure events. The method 500 begins at a start operation and flow moves to operation 502.

At operation 502 a time series comprising system event log data for a plurality of events and a plurality of event types that occurred on a server computing device is received. Examples of event types that may be included in the system event log data include: voltage exceeding a threshold value, temperature exceeding a threshold value, operating system reboot, internal component failure events, power supply being inserted, and/or power supply being removed.

From operation 502 flow continues to operation 504 where the time series is filtered for a subset of the plurality of event types. That is, the time series is filtered so that only events that have event types corresponding to event types that a recurrent neural network has been trained to process to predict hardware failures are included in the time series. For example, if the recurrent neural network has been trained to predict hardware failure events based on processing time series data that includes event type A and event type B, but the time series includes event types A-G, event data for event types C-G may be filtered out of the time series at operation 504.

From operation 504 flow continues to operation 506 where the filtered time series is processed with a recurrent neural network that has been trained to predict hardware failure events from time series data comprising the subset of the plurality of event types. The recurrent neural network may comprise a GRU neural network or an LSTM neural network. The recurrent neural network may have been trained to predict hardware failure events of one or more types (e.g., uncorrectable memory error, CPU internal error) based on processing time series data that includes a plurality of event types. The recurrent neural network may have been trained to predict whether those hardware failure events are going to occur within one or more threshold durations of time (e.g., predict first error type event within X minutes, predict first error type event within Y hours, predict second error type event within Y hours, predict second error type event within X days).

From operation 506 flow continues to operation 508 where a prediction is made that the hardware failure event will occur on the server computing device within a threshold duration of time.

From operation 508 flow continues to operation 510 where a prophylactic follow-up action corresponding to the predicted hardware failure event is performed. The prophylactic follow-up action may comprise one or more of: freezing onboarding of new workloads and/or virtual machines on the server computing device; flagging the server computing device; and/or migrating a virtual machine and/or workload from the server computing device to one or more different server computing devices.

From operation 510 flow moves to an end operation and the method 500 ends.

Figure 6:
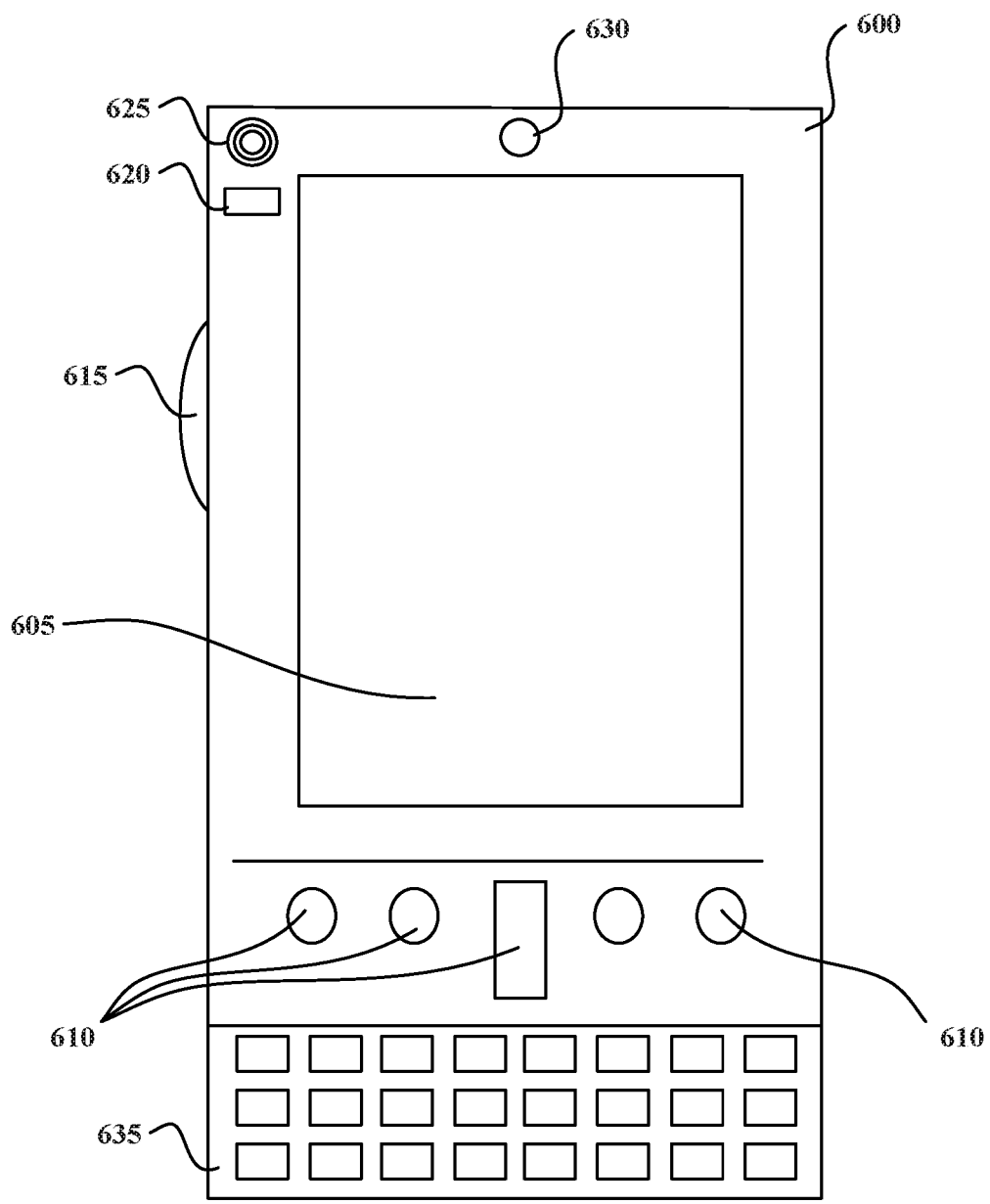
FIGS. 6 and 7 are simplified diagrams of a mobile computing device with which aspects of the disclosure may be practiced.
Figure 7:
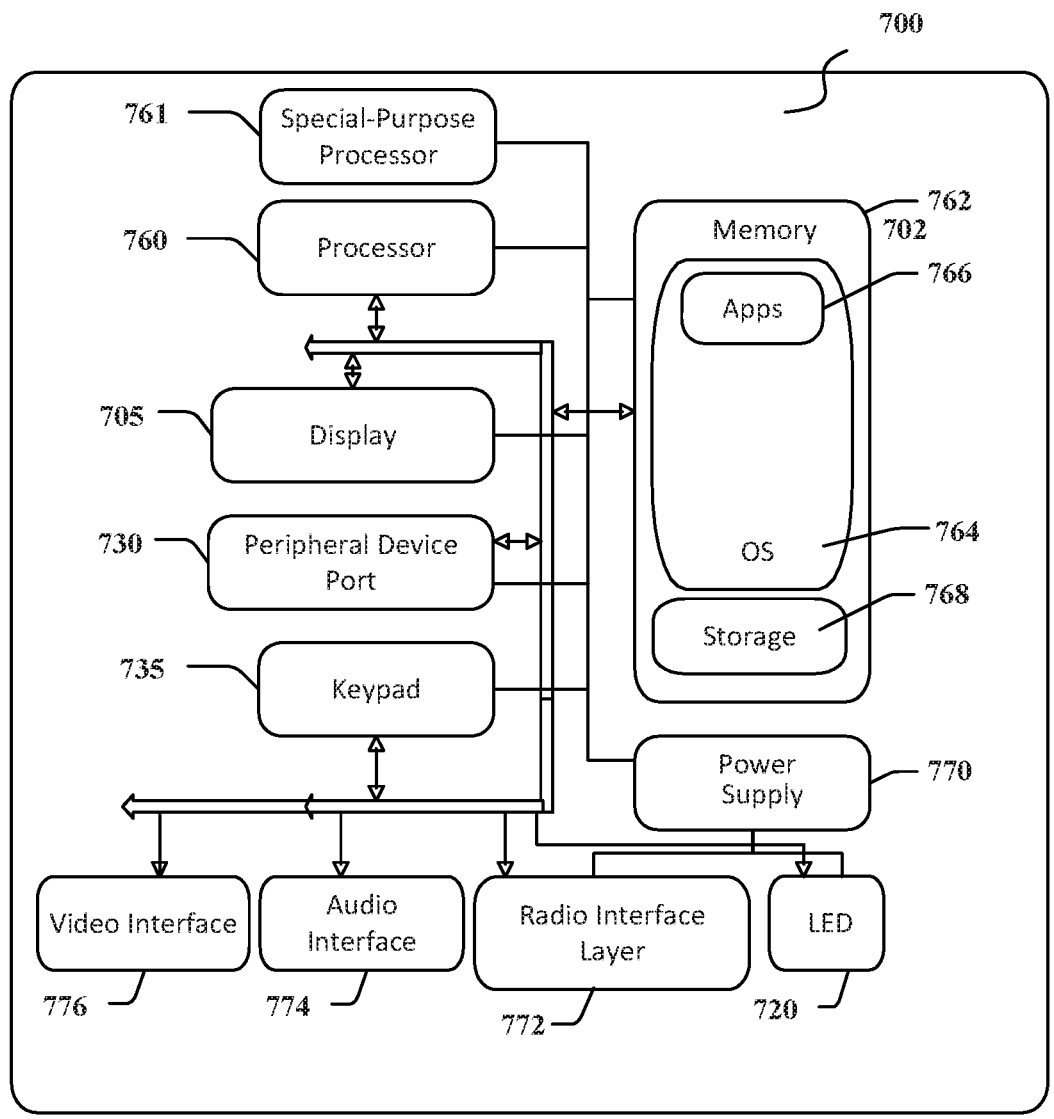

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625.

In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
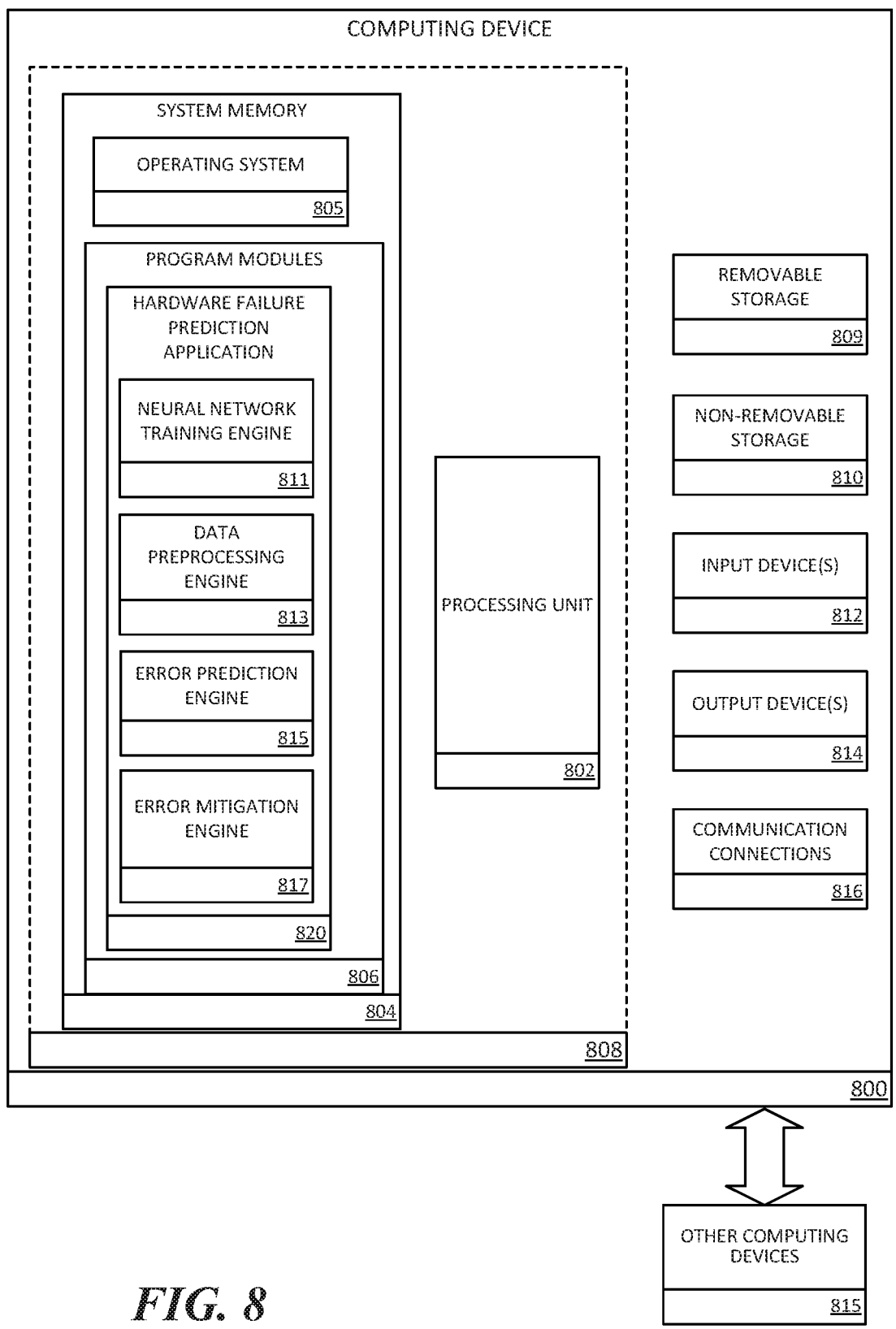
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for predicting hardware failure events by processing event time series data. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more hardware failure prediction programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., hardware failure prediction application 820) may perform processes including, but not limited to, the aspects, as described herein. According to examples, neural network training engine 811 may perform one or more operations associated with feeding preprocessed time series data of specific even types to recurrent neural network and modifying one or more values, functions, weights, and/or connections associated with that recurrent neural network based on the recurrent neural network's classification of those time series as resulting in a hardware failure event within a threshold duration of time or not resulting in a hardware failure event within a threshold duration of time. Data preprocessing engine 813 may preprocess time series data for training a recurrent neural network to predict hardware failure events, and for predicting hardware failure events from real-time time series data. Error prediction engine 815 may perform one or more operations associated with applying functions to one or more output values from a recurrent neural network that has processed time series data, and predicting whether a hardware failure event will occur in a threshold duration of time. Error mitigation engine 817 may perform one or more operations associated with moving virtual machines and/or workloads from a server that is predicted to experience a hardware failure event within a threshold duration of time, ceasing to onboard new virtual machines and/or workloads on servers that are predicted to experience hardware failure events within a threshold duration of time, and/or flagging servers that are predicted to experience hardware failure events within a threshold duration of time.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
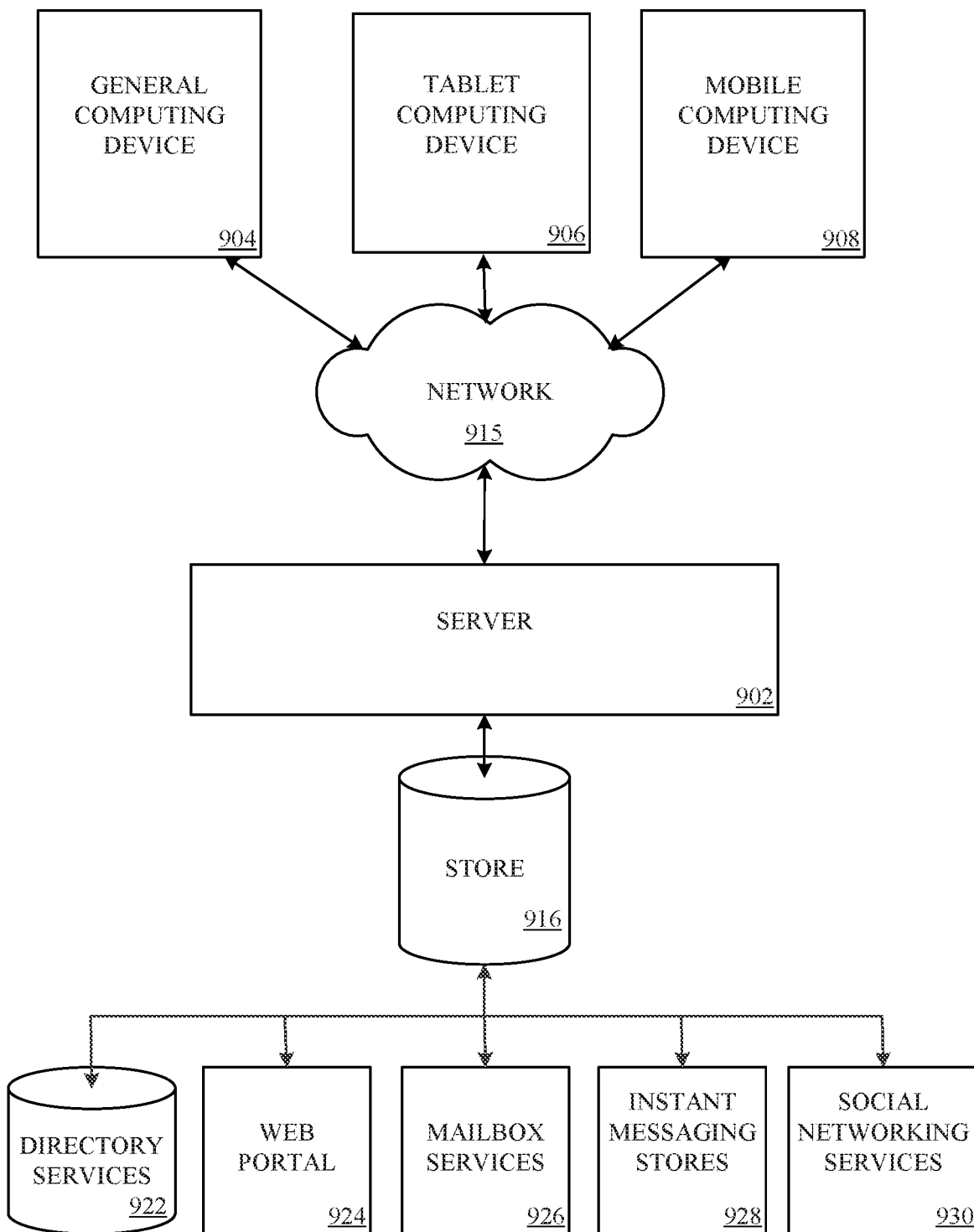
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either preprocessed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for predicting hardware failure events, the method comprising:
   receiving a time series comprising event log data for a plurality of events and a plurality of event types that occurred on a server computing device;
   filtering the time series to generate a filtered time series, wherein the filtering comprises removing event log data for the plurality of events except for events having one of a subset of the plurality of event types, and wherein the subset of the plurality of event types consists of event types that a recurrent neural network has been trained to process;
   processing the filtered time series with the recurrent neural network that has been trained to predict hardware failure events from time series data comprising the subset of the plurality of event types;
   predicting, based on the processing the filtered time series, that a hardware failure event will occur on the server computing device within a threshold duration of time from a current time; and
   in response to predicting the hardware failure event, automatically performing a prophylactic follow-up action corresponding to the hardware failure event to mitigate an impact of the hardware failure event before the hardware failure event occurs.

2. The computer-implemented method of claim 1, wherein the prophylactic follow-up action comprises freezing onboarding of new workloads on the server computing device.

3. The computer-implemented method of claim 1, wherein the prophylactic follow-up action comprises migrating a virtual machine from the server computing device to a different server computing device.

4. The computer-implemented method of claim 1, wherein the recurrent neural network is one of: a long short-term memory neural network; and a gated recurrent unit neural network.

5. The computer-implemented method of claim 1, wherein the hardware failure event is a catastrophic hardware failure event comprising one of: an uncorrectable memory error; and a CPU internal error.

6. The computer-implemented method of claim 1, further comprising segmenting the time series into a size corresponding to a specific number of the subset of the plurality of event types.

7. The computer-implemented method of claim 1, further comprising:
   determining that there is more than a second threshold duration of time at a location in the time series that separates a first event in the time series and a second event in the time series; and
   segmenting the time series at the location.

8. The computer-implemented method of claim 1, further comprising:
   generating a vector for each event in the filtered time series, wherein each vector comprises: a time dimension corresponding to a time stamp for an event; and an event type dimension corresponding to an event type of an event.

9. The computer-implemented method of claim 8, wherein processing the filtered time series with the recurrent neural network comprises processing each vector for each event in the filtered time series with the recurrent neural network.

10. The computer-implemented method of claim 9, wherein each vector for each event in the filtered time series is processed with the recurrent neural network in a temporal order in which it occurred at the server computing device.

11. The computer-implemented method of claim 8, wherein each vector further comprises: a sensor type dimension corresponding to a type of sensor that generated an event.

12. The computer-implemented method of claim 1, further comprising training the recurrent neural network, the training comprising:
   receiving a first training time series comprising event log data for a first plurality of events and the plurality of event types that occurred on a first server computing device;
   determining that the first training time series includes a catastrophic hardware failure event;
   filtering the first training time series for the subset of the plurality of event types;
   identifying a location in the filtered first training time series corresponding to a threshold number of events of the subset of the plurality of event types from the catastrophic hardware failure event; and
   processing the threshold number of the plurality of events of the subset of the plurality of event types with the recurrent neural network.

13. The computer-implemented method of claim 12, further comprising:
   generating a score based on the processing;
   determining that the score corresponds to no catastrophic hardware failure event occurring in the threshold duration of time; and
   modifying at least one gate in the recurrent neural network.

14. The computer-implemented method of claim 12, wherein the hardware failure event is a catastrophic solid state drive event.

15. A system for predicting hardware failure events, comprising:
   a memory for storing executable program code; and
   a processor, functionally coupled to the memory, the processor being responsive to computer-executable instructions contained in the executable program code and operative to:
      receive a time series comprising event log data for a plurality of events and a plurality of event types that occurred on a server computing device;
      filtering the time series to generate a filtered time series, wherein the filtering comprises removing event log data for the plurality of events except for events having one of a subset of the plurality of event types, and wherein the subset of the plurality of event types consists of event types that a recurrent neural network has been trained to process;
      process the filtered time series with the recurrent neural network that has been trained to predict hardware failure events from time series data comprising the subset of the plurality of event types;
      predict, based on the processing of the filtered time series, that a hardware failure event will occur on the server computing device within a threshold duration of time from a current time; and
      in response to predicting the hardware failure event, automatically perform a prophylactic follow-up action corresponding to the hardware failure event to mitigate an impact of the hardware failure event before the hardware failure event occurs.

16. The system of claim 15, wherein in performing the prophylactic follow-up action corresponding to the hardware failure event, the processor is further responsive to the computer-executable instructions contained in the executable program code and operative to:
   freeze onboarding of new workloads on the server computing device.

17. The system of claim 15, wherein the processor is further responsive to the computer-executable instructions contained in the executable program code and operative to:
   segment the time series into a size corresponding to a specific number of the subset of the plurality of event types.

18. The system of claim 15, wherein the processor is further responsive to the computer-executable instructions contained in the executable program code and operative to:
   generate a vector for each event in the filtered time series, wherein each vector comprises: a time dimension corresponding to a timestamp for an event; and an event type dimension corresponding to an event type of an event.

19. The system of claim 18, wherein in processing the filtered time series with the recurrent neural network, the processor is further responsive to the computer executable instructions contained in the executable program code and operative to:

process each vector for each event in the filtered time series with the recurrent neural network.

20. A computer-readable storage device comprising executable instructions that, when executed by a processor, assists with predicting hardware failure events, the computer-readable storage device including instructions executable by the processor for:

receiving a time series comprising event log data for a plurality of events and a plurality of event types that occurred on a server computing device;

filtering the time series to generate a filtered time series, wherein the filtering comprises removing event log data for the plurality of events except for events having one of a subset of the plurality of event types, and wherein the subset of the plurality of event types consists of event types that a recurrent neural network has been trained to process;

processing the filtered time series with the recurrent neural network that has been trained to predict hardware failure events from time series data comprising the subset of the plurality of event types;

predicting, based on the processing the filtered time series, that a hardware failure event will occur on the server computing device within a threshold duration of time from a current time; and in response to predicting the hardware failure event, automatically performing a prophylactic follow-up action corresponding to the hardware failure event to mitigate an impact of the hardware failure event before the hardware failure event occurs.

* * * * *